(12) United States Patent
Watanabe

(10) Patent No.: US 11,587,554 B2
(45) Date of Patent: Feb. 21, 2023

(54) CONTROL APPARATUS, VOICE INTERACTION APPARATUS, VOICE RECOGNITION SERVER, AND PROGRAM

(71) Applicant: Toyota Jidosha Kabushiki Kaisha, Toyota (JP)

(72) Inventor: Narimasa Watanabe, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 350 days.

(21) Appl. No.: 16/715,359

(22) Filed: Dec. 16, 2019

(65) Prior Publication Data
US 2020/0202842 A1   Jun. 25, 2020

(30) Foreign Application Priority Data
Dec. 20, 2018   (JP) .............................. JP2018-238287

(51) Int. Cl.
| | | |
|---|---|---|
| *G10L 15/08* | (2006.01) | |
| *G10L 15/02* | (2006.01) | |
| *G06F 3/16* | (2006.01) | |
| *G10L 17/06* | (2013.01) | |

(52) U.S. Cl.
CPC ................ *G10L 15/08* (2013.01); *G06F 3/16* (2013.01); *G10L 15/02* (2013.01); *G10L 17/06* (2013.01)

(58) Field of Classification Search
CPC ................................ G10L 15/02; G10L 15/08
See application file for complete search history.

(56) References Cited

U.S. PATENT DOCUMENTS

| | | | | |
|---|---|---|---|---|
| 5,865,626 A | * | 2/1999 | Beattie | G09B 19/04 704/240 |
| 9,601,112 B2 | * | 3/2017 | Kim | G10L 15/07 |
| 9,953,634 B1 | * | 4/2018 | Pearce | G10L 15/063 |
| 2008/0300871 A1 | * | 12/2008 | Gilbert | G10L 15/30 704/E15.001 |
| 2015/0248884 A1 | * | 9/2015 | Ljolje | G10L 15/28 704/243 |
| 2016/0314790 A1 | * | 10/2016 | Tsujikawa | G10L 17/06 |
| 2018/0314689 A1 | * | 11/2018 | Wang | G10L 15/1822 |
| 2019/0096396 A1 | * | 3/2019 | Jiang | G10L 15/02 |
| 2019/0206389 A1 | * | 7/2019 | Kwon | G10L 15/075 |

FOREIGN PATENT DOCUMENTS

| | | |
|---|---|---|
| JP | 2018-045190 A | 3/2018 |
| JP | 2018-109663 A | 7/2018 |

* cited by examiner

*Primary Examiner* — Bryan S Blankenagel
(74) *Attorney, Agent, or Firm* — Dinsmore & Shohl LLP

(57) ABSTRACT

The control system includes a calculation unit configured to control a voice interaction system including voice recognition models, in which the calculation unit instructs, when a conversation with a target person is started, the voice interaction system to first perform voice recognition and response generation by one voice recognition model tentatively selected from among the voice recognition models, determines a voice recognition model estimated to be optimal among the voice recognition models held in the voice interaction system based on results of the voice recognition of a speech made by the target person in a voice recognition server, and instructs, when the voice recognition model estimated to be optimal is different from the one voice recognition model tentatively selected, the voice interaction system to switch the voice recognition model to the one estimated to be optimal and to perform voice recognition and response generation.

5 Claims, 7 Drawing Sheets

CONTROL APPARATUS, VOICE INTERACTION APPARATUS, VOICE RECOGNITION SERVER, AND PROGRAM

CROSS REFERENCE TO RELATED APPLICATIONS

This application is based upon and claims the benefit of priority from Japanese patent application No. 2018-238287, filed on Dec. 20, 2018, the disclosure of which is incorporated herein in its entirety by reference.

BACKGROUND

The present disclosure relates to a control system, a voice interaction system, a voice recognition server, and a program.

Voice interaction systems for analyzing a speech made by a target person (user), who is a conversation partner, grasping the meaning and the content of the speech, generating a response in accordance with the type of the speech, and presenting the response to the target person by a voice or a text have been known. Japanese Unexamined Patent Application Publication Nos. 2018-109663 and 2018-045190 disclose the voice interaction systems configured to perform conversation processing by a server side in which the accuracy of voice recognition is high and a local (terminal device) side in which the response speed is high in a divided manner.

SUMMARY

In the techniques disclosed in Japanese Unexamined Patent Application Publication Nos. 2018-109663 and 2018-045190, in order to increase the accuracy of a response, voice recognition and response generation need to be performed on the server side. In this case, however, there is a problem that it takes a relatively long time to make a response due to restrictions in a rate of communication between the terminal device and the server. In Japanese Unexamined Patent Application Publication No. 2018-045190, in a period required to send a response generated by a server after the target person has made an utterance (delay period), the voice interaction system gains time by responding in a simple way such as making an agreeable response or repeating the speech made by the target person. However, when the voice interaction system makes a response to gain time for each delay period, the conversation becomes an unnatural one, and it is possible that the stress that the target person feels during the delay period may not be sufficiently relieved.

The present disclosure has been made in view of the aforementioned circumstances, and aims to provide a control system of a voice interaction system, a voice interaction system, a voice recognition server, and a program capable of reducing time required for a response and reducing unnaturalness of a conversation.

A control system according to one embodiment of the present disclosure includes: a calculation unit configured to control a voice interaction system including a plurality of voice recognition models, in which the calculation unit instructs, when a conversation with a target person is started, the voice interaction system to first perform voice recognition and response generation by one voice recognition model that has been tentatively selected from among the plurality of voice recognition models, determines a voice recognition model that is estimated to be optimal among the plurality of voice recognition models held in the voice interaction system based on results of the voice recognition of a speech made by the target person in a voice recognition server, and instructs, when the voice recognition model that is estimated to be optimal and the one voice recognition model that has been tentatively selected are different from each other, the voice interaction system to switch the voice recognition model to the one that is estimated to be optimal and to perform voice recognition and response generation.

The calculation unit of the control system instructs, when a conversation with the target person is started, the voice interaction system to first perform voice recognition and response generation by the one voice recognition model that has been tentatively selected from among the plurality of voice recognition models included in the voice interaction system. According to this procedure, it is possible to reduce the time required for the response by the voice interaction system. Then the calculation unit determines the voice recognition model that is estimated to be optimal among the plurality of voice recognition models held in the voice interaction system based on results of the voice recognition regarding a speech made by the target person in the voice recognition server. The one voice recognition model that has been tentatively selected is switched to the determined voice recognition model that is estimated to be optimal based on the results of the voice recognition of the voice recognition server in which the accuracy of the voice recognition is high, whereby it becomes possible to reduce unnaturalness of the response.

Further, the voice recognition model that has been tentatively selected may be the one that has been determined to be used most frequently among the plurality of voice recognition models included in the voice interaction system based on past conversation information. According to this technique, it is possible to reduce the degree that the response by the one voice recognition model that has been tentatively selected gives a feeling of strangeness to the target person.

Further, the calculation unit may cause, when the voice interaction system switches the voice recognition model to the one that is estimated to be optimal, the voice interaction system to switch, in stages, the voice recognition model to the one that is estimated to be optimal from a voice recognition model whose similarity level with the one voice recognition model that has been tentatively selected is high. According to this technique, compared to a case in which the voice recognition model is suddenly switched to the one that is estimated to be optimal, it is possible to reduce a feeling of strangeness that the target person feels in conversation.

Further, the calculation unit may take into account information other than a voice regarding the target person when it determines the voice recognition model that is estimated to be optimal. This information is taken into account when the voice recognition model that is estimated to be optimal is determined, whereby it is possible to increase the probability that the determined voice recognition model is optimal.

A voice interaction system according to one embodiment of the present disclosure includes: a plurality of voice recognition models and a controller, in which the controller first performs, when a conversation with a target person is started, voice recognition and response generation by one voice recognition model that has been tentatively selected from among the plurality of voice recognition models, determines a voice recognition model that is estimated to be optimal among the plurality of voice recognition models based on results of the voice recognition of a speech made by the target person in a voice recognition server, and switches, when the voice recognition model that is estimated to be optimal and the one voice recognition model that has been tentatively selected are different from each other, the voice recognition model to the one that is estimated to be optimal and performs voice recognition and response generation. It is therefore possible to reduce time required for the response and to reduce unnaturalness of the conversation.

A voice recognition server according to one embodiment of the present disclosure includes: a controller, in which the controller instructs, when a conversation with a target person is started, a voice interaction system including a plurality of voice recognition models to first perform voice recognition and response generation by one voice recognition model that has been tentatively selected from among the plurality of voice recognition models, determines a voice recognition model that is estimated to be optimal among the plurality of voice recognition models held in the voice interaction system based on results of the voice recognition of a speech made by the target person, and instructs, when the voice recognition model that is estimated to be optimal and the one voice recognition model that has been tentatively selected are different from each other, the voice interaction system to switch the voice recognition model to the one that is estimated to be optimal and to perform voice recognition and response generation. It is therefore possible to reduce time required for the response and to reduce unnaturalness of the conversation.

A program according to one embodiment of the present disclosure is a program for causing a computer to execute processing procedures for controlling a voice interaction system including a plurality of voice recognition models, the processing procedures including: a processing procedure for instructing, when a conversation with a target person is started, the voice interaction system to first perform voice recognition and response generation by one voice recognition model that has been tentatively selected from among the plurality of voice recognition models; a processing procedure for determining a voice recognition model that is estimated to be optimal among the plurality of voice recognition models held in the voice interaction system based on the results of the voice recognition of a speech made by the target person in a voice recognition server; and a processing procedure for instructing, when the voice recognition model that is estimated to be optimal and the one voice recognition model that has been tentatively selected are different from each other, the voice interaction system to switch the voice recognition model to the one that is estimated to be optimal and to perform voice recognition and response generation. It is therefore possible to reduce time required for the response and to reduce unnaturalness of the conversation.

According to the present disclosure, it is possible to reduce time required for the response and to reduce unnaturalness of the conversation.

The above and other objects, features and advantages of the present disclosure will become more fully understood from the detailed description given hereinbelow and the accompanying drawings which are given by way of illustration only, and thus are not to be considered as limiting the present disclosure.

DETAILED DESCRIPTION

Hereinafter, although the present disclosure will be described with reference to embodiments of the disclosure, the disclosure according to claims is not limited to the following embodiments. Moreover, all the components described in the following embodiments are not necessarily indispensable for means to solve problems. For the sake of clarification of the description, the following description and the drawings are omitted and simplified as appropriate. Throughout the drawings, the same components are denoted by the same reference symbols and overlapping descriptions are omitted as necessary.

First Embodiment

First, a configuration of a voice interaction system including a control system according to a first embodiment will be explained.

Figure 1:
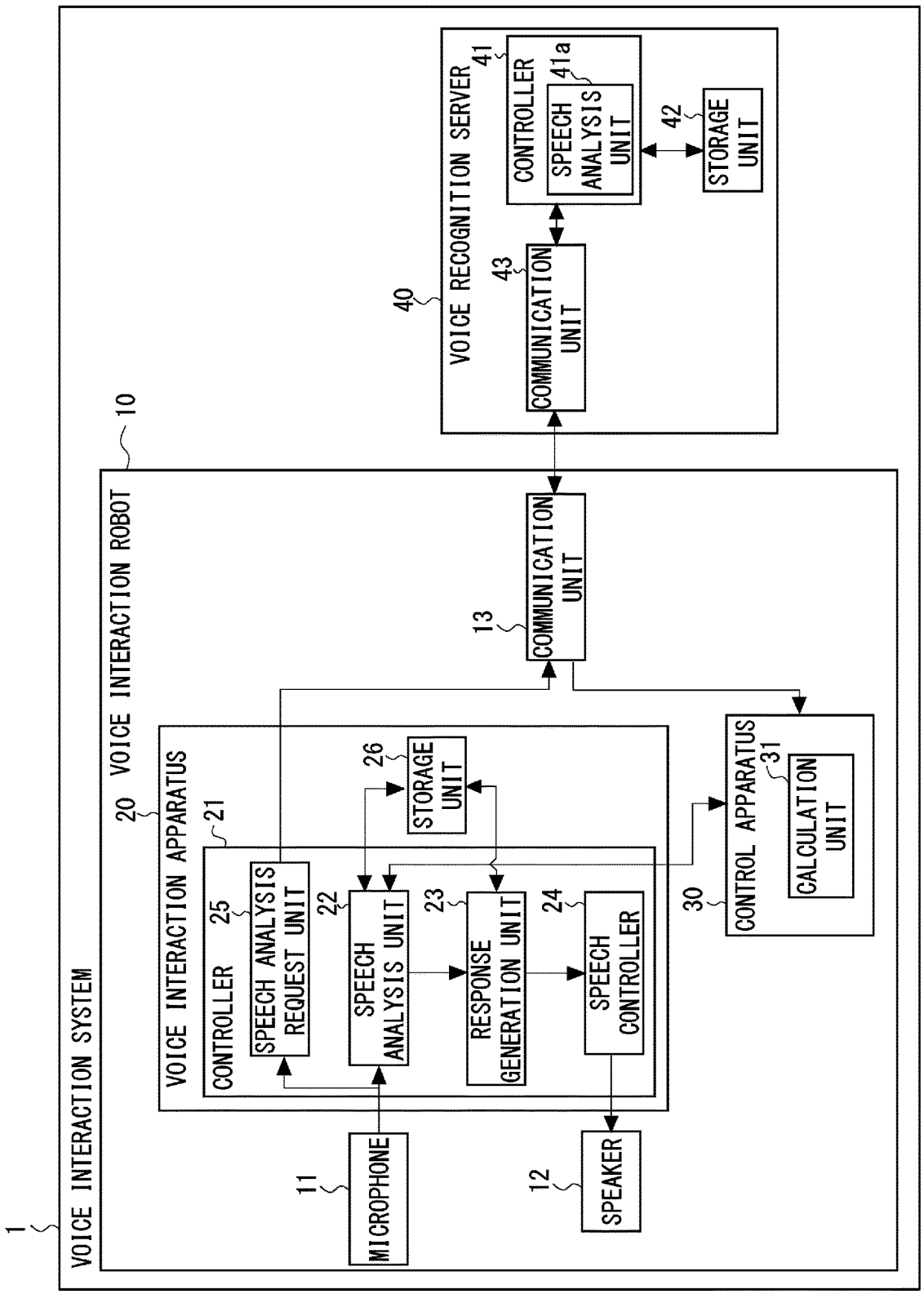
FIG. 1 is a block diagram for describing a configuration of a voice interaction system including a control system according to a first embodiment.

FIG. 1 is a block diagram for describing a configuration of a voice interaction system 1 including a control system 30 according to the first embodiment. As shown in FIG. 1, the voice interaction system 1 includes a voice interaction robot 10 and a voice recognition server 40.

The voice interaction robot 10 includes a voice interaction system 20 and the control system 30 incorporated therein. Further, the voice interaction robot 10 includes a microphone 11, a speaker 12, and a communication unit 13.

Figure 2:
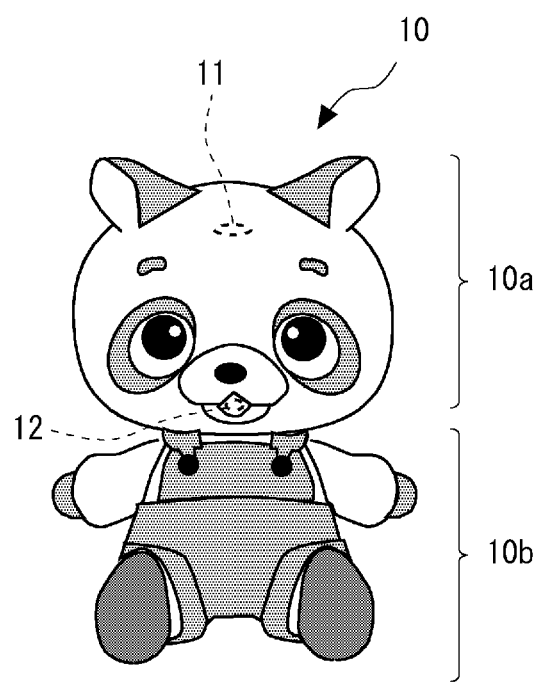
FIG. 2 is a schematic view showing one example of an exterior of a voice interaction robot including the control system according to the first embodiment incorporated therein.

FIG. 2 is a schematic view showing one example of an exterior of the voice interaction robot 10 including the voice interaction system 20 and the control system shown in FIG. 1 incorporated therein. As shown in FIG. 2, the voice interaction robot 10, which imitates an animal in appearance, includes a head part 10a and a body part 10b. The microphone 11 is disposed in a hidden way in a desired position of the head part 10a. The speaker 12 is disposed in a hidden way in the position that corresponds to the mouth of the voice interaction robot 10.

The microphone 11 serves as an input unit configured to input a speech voice made by a target person, who is a conversation partner of the voice interaction robot 10, to the voice interaction system 20. Specifically, the microphone 11 collects a speech voice made by the target person, converts the collected voice into a voice signal, and passes this voice signal to the voice interaction system 20.

The speaker 12 serves as an output unit that emits a voice generated by the voice interaction system 20. Specifically, the speaker 12 receives a voice signal of a response generated by the voice interaction system 20, and outputs the received voice signal as the voice.

Referring once again to FIG. 1, the voice interaction system 20 includes a controller 21 and a storage unit 26.

The controller 21, which is composed of, for example, a CPU, also serves as a function execution unit that performs execution for each function. The controller 21 mainly operates as a speech analysis unit 22, a response generation unit 23, a speech controller 24, and a speech analysis request unit 25.

The speech analysis unit 22 performs voice recognition and analysis of the content of the speech using voice recognition models stored in the storage unit 26. Specifically, the speech analysis unit 22 performs voice recognition of the voice signal received from the microphone 11, converts this voice signal into a text, performs voice analysis (natural language processing such as morpheme analysis or modification analysis) of the obtained text data, and analyzes the content of the speech using the voice recognition models stored in the storage unit 26. The storage unit 26 is composed of, for example, a storage medium of a hard disc drive.

The response generation unit 23 receives the results of performing the voice recognition and the analysis of the content of the speech in the speech analysis unit 22 and generates a response (generates a text of a response sentence) to the speech made by the target person using the response generation models stored in the storage unit 26. The speech controller 24 converts the text of the response sentence received from the response generation unit 23 into a voice signal and passes this voice signal to the speaker 12.

Figure 3:
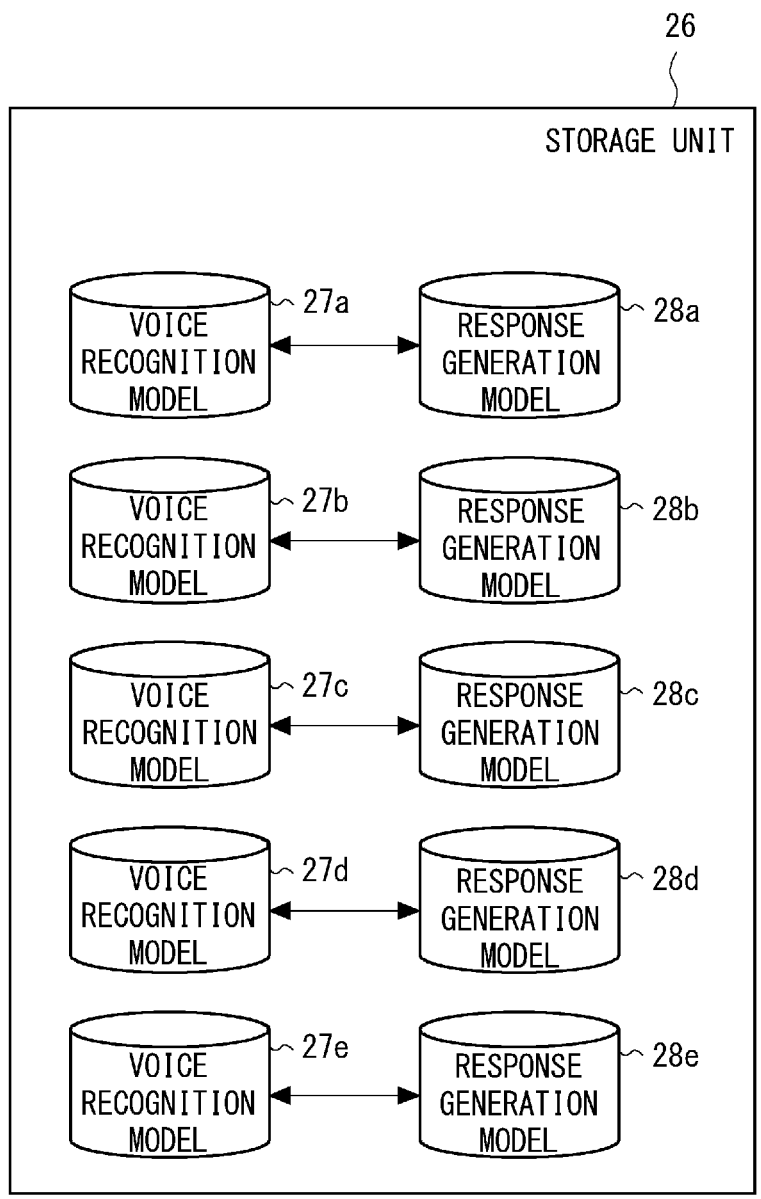
FIG. 3 is a schematic view showing one example of a database stored in a storage unit of a voice interaction system included in the voice interaction system.

FIG. 3 is a schematic view showing one example of a database stored in the storage unit 26 of the voice interaction system 20. As shown in FIG. 3, the storage unit 26 stores a plurality of voice recognition models (in the example shown in FIG. 3, voice recognition models 27*a*, 27*b*, 27*c*, 27*d*, 27*e*) as the database. The plurality of different voice recognition models are the ones that have been stratified by, for example, sex, age, hometown, and the place where the voice has been collected (e.g., indoor or outdoor).

The storage unit 26 further stores a plurality of response generation models (in the example shown in FIG. 3, response generation models 28*a*, 28*b*, 28*c*, 28*d*, 28*e*) that correspond to the plurality of different voice recognition models as the database. That is, the voice recognition model 27*a* corresponds to the response generation model 28*a*. In a similar way, the voice recognition model 27*b* corresponds to the response generation model 28*b*, the voice recognition model 27*c* corresponds to the response generation model 28*c*, the voice recognition model 27*d* corresponds to the response generation model 28*d*, and the voice recognition model 27*e* corresponds to the response generation model 28*e*. The response generation unit 23 performs response generation using the response generation model that corresponds to the voice recognition model that has been used to perform the voice recognition and the analysis of the content of the speech in the speech analysis unit 22.

Referring once again to FIG. 1, the speech analysis request unit 25 requests the voice recognition server 40 to perform the voice recognition of the speech made by the target person and the analysis of the content of the speech made by the target person. In order to request the voice recognition server 40 to perform voice recognition and analysis of the content of the speech, it is required to perform communication between the voice interaction robot 10 and the voice recognition server 40. The speech analysis request unit 25 transmits a command for requesting the voice recognition server 40 to perform voice recognition of the speech made by the target person and analysis of the content of the speech made by the target person and voice data of the speech made by the target person to the voice recognition server 40 via the communication unit 13. The communication unit 13, which is a communication interface for transmitting and receiving a control signal and voice data to and from a communication unit 43 of the voice recognition server 40 described later, is, for example, a wireless LAN unit.

The voice recognition server 40 includes a controller 41, a storage unit 42, and a communication unit 43. The communication unit 43, which is a communication interface for transmitting and receiving a control signal or voice data to and from the aforementioned communication unit 13 of the voice interaction robot 10, is, for example, a wireless LAN unit. The controller 41 is composed of, for example, a CPU, and includes a speech analysis unit 41*a*. When the communication unit 43 has received a command for requesting voice recognition of the speech made by the target person and analysis of the content of the speech made by the target person and voice data of the speech made by the target person, the speech analysis unit 41*a* performs voice recognition of the speech made by the target person and analysis of the content of the speech made by the target person using the voice recognition models stored in the storage unit 42. The speech analysis unit 41*a* of the voice recognition server 40 has a calculation processing ability higher than that of the speech analysis unit 22 of the voice interaction system 20.

Figure 4:
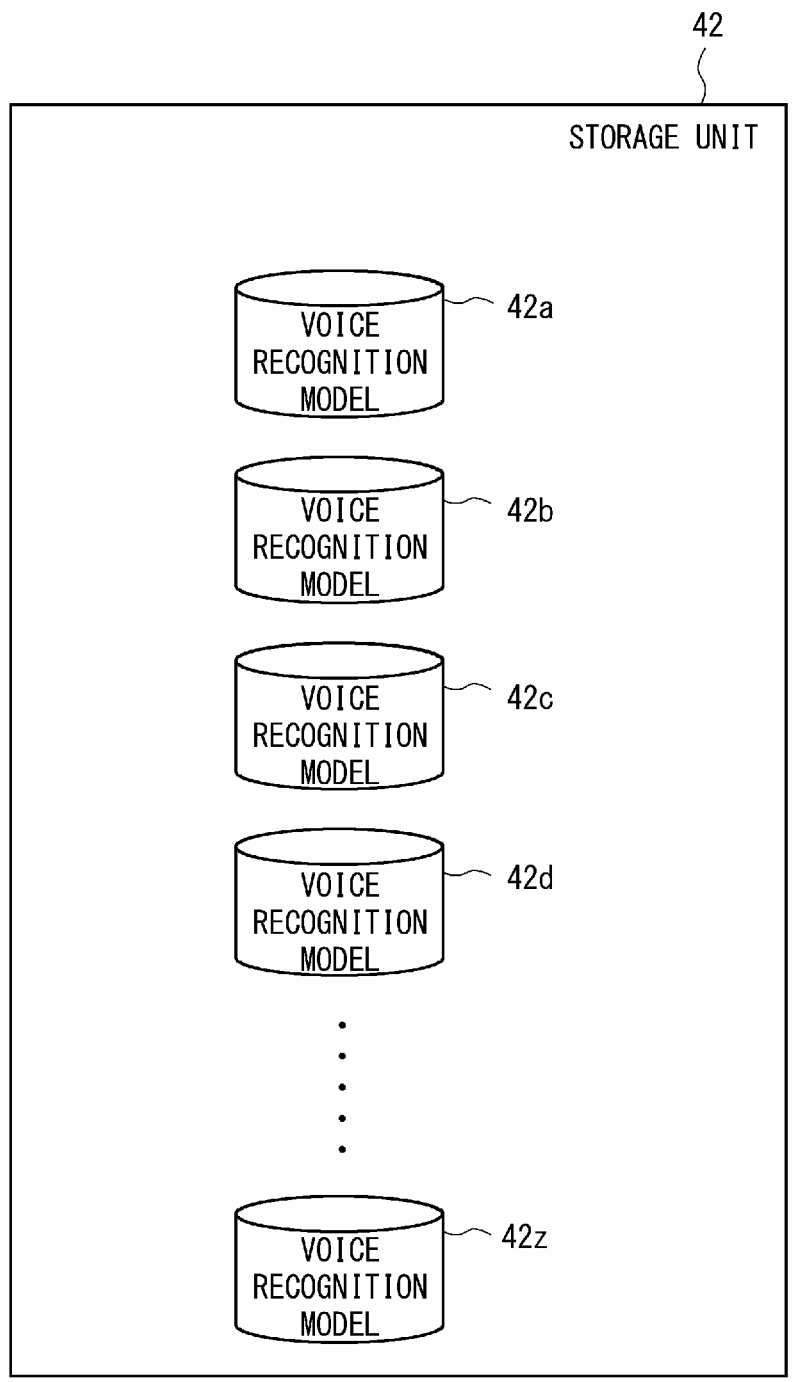
FIG. 4 is a schematic view showing one example of a database stored in a storage unit of a voice recognition server included in the voice interaction system.

FIG. 4 is a schematic view showing one example of a database stored in the storage unit 42 of the voice recognition server 40. As shown in FIG. 4, the storage unit 42 stores a plurality of voice recognition models (in the example shown in FIG. 4, voice recognition models 42*a*, 42*b*, 42*c*, 42*d*, . . . , 42*z*) as the database. The plurality of different voice recognition models are the ones that have been stratified by, for example, sex, age, hometown, and the place where the voice has been collected (e.g., indoor or outdoor). The storage unit 42 has a storage capacity larger than that of the storage unit 26 of the voice interaction system 20 described above and stores voice recognition models whose number is larger than those stored in the storage unit 26 (see FIG. 3) of the voice interaction system 20.

Referring once again to FIG. 1, the speech analysis unit 41*a* of the voice recognition server 40 performs voice recognition of the speech made by the target person and analysis of the content of the speech made by the target person using each of the plurality of voice recognition models stored in the storage unit 42 (see FIG. 4), and outputs the results of the voice recognition and the likelihood of the results of the voice recognition for each of the voice recognition models. As described above, the speech analysis unit 41*a* of the voice recognition server 40 has a calculation processing ability higher than that of the speech analysis unit 22 of the voice interaction system 20. Therefore, the speech analysis unit 41*a* in the voice recognition server 40 is able to perform voice recognition of the speech made by the target person and analysis of the content of the speech made by the target person using the plurality of voice recognition models. The results of the voice recognition for each of the voice recognition models and the data of the corresponding likelihood for each of the voice recognition models obtained by the voice recognition server 40 are sent to the control system 30 via the communication unit 13.

The control system 30 includes a calculation unit 31. When a conversation with the target person is started, the calculation unit 31 instructs the speech analysis unit 22 of the voice interaction system 20 to first perform voice recognition and response generation by the one voice recognition model that has been tentatively selected from among the plurality of voice recognition models stored in the storage unit 26. The one voice recognition model that has been tentatively selected may be a voice recognition model that has been determined to be used most frequently based on past conversation information among the plurality of voice recognition models held by the voice interaction system. According to this technique, it is possible to reduce the degree that the response by the one voice recognition model that has been tentatively selected gives a feeling of strangeness to the target person.

The calculation unit 31 determines the voice recognition model that is estimated to be optimal among the plurality of voice recognition models held in the voice interaction system 20 based on the results of the voice recognition of the speech made by the target person in the voice recognition server. Specifically, the calculation unit 31 determines the voice recognition model that is the most similar to the voice recognition model that has been used for the one whose likelihood is the largest among the results of the voice recognition sent from the voice recognition server 40 among the voice recognition models held by the voice interaction system 20 to be the voice recognition model that is estimated to be optimal.

When the calculation unit 31 determines the voice recognition model that is estimated to be optimal, the calculation unit 31 may take into account information other than a voice regarding the target person. The information other than a voice regarding the target person is, for example, when a camera is installed in the voice interaction robot 10, information such as the face of the target person or objects that this person wears recognized from an image including the target person captured by this camera. It is possible to estimate the sex, the age group and the like of the target person from the above information. Therefore, this information are taken into account when the voice recognition model that is estimated to be optimal is determined, whereby it is possible to increase the probability that the determined voice recognition model is optimal.

When the determined voice recognition model that is estimated to be optimal and the one voice recognition model that has been tentatively selected are different from each other, the calculation unit 31 of the control system 30 instructs the speech analysis unit 22 of the voice interaction system 20 to switch the voice recognition model to the one that is estimated to be optimal and perform voice recognition and response generation. The calculation unit 31 may instruct the voice interaction system 20 to switch, in stages, the voice recognition model to the voice recognition model that is estimated to be optimal from the voice recognition model whose similarity level with the one voice recognition model that has been tentatively selected is high when the voice recognition model is switched to the one that is estimated to be optimal.

Assume a case, for example, that the voice recognition model 27a is a voice recognition model whose age group is less than ten, the voice recognition model 27b is a voice recognition model whose age group is between ten to nineteen, and the voice recognition model 27c is a voice recognition model whose age group is twenties and thirties in FIG. 3. It is further assumed that the voice recognition model 27d is a voice recognition model whose age group is forties and fifties, and the voice recognition model 27e is a voice recognition model whose age group is sixties and higher. It is further assumed that the one voice recognition model that has been tentatively selected is the voice recognition model 27b, and the voice recognition model 27e has been determined to be the voice recognition model that is estimated to be optimal. In this case, the voice recognition models are switched in stages from the voice recognition model 27c, the voice recognition model 27d, and the voice recognition model 27e in a descending order of similarity with the voice recognition model 27b, which is one voice recognition model that has been tentatively selected (in an order of closeness in terms of age). According to this technique, it is possible to reduce a feeling of strangeness that the target person feels in conversation compared to a case in which the voice recognition model is suddenly switched to the one that is estimated to be optimal.

Next, a flow of processing for controlling the voice interaction system 20 executed by the control system 30 will be explained. In the following description, reference is made also to FIG. 1 as appropriate.

Figure 5:
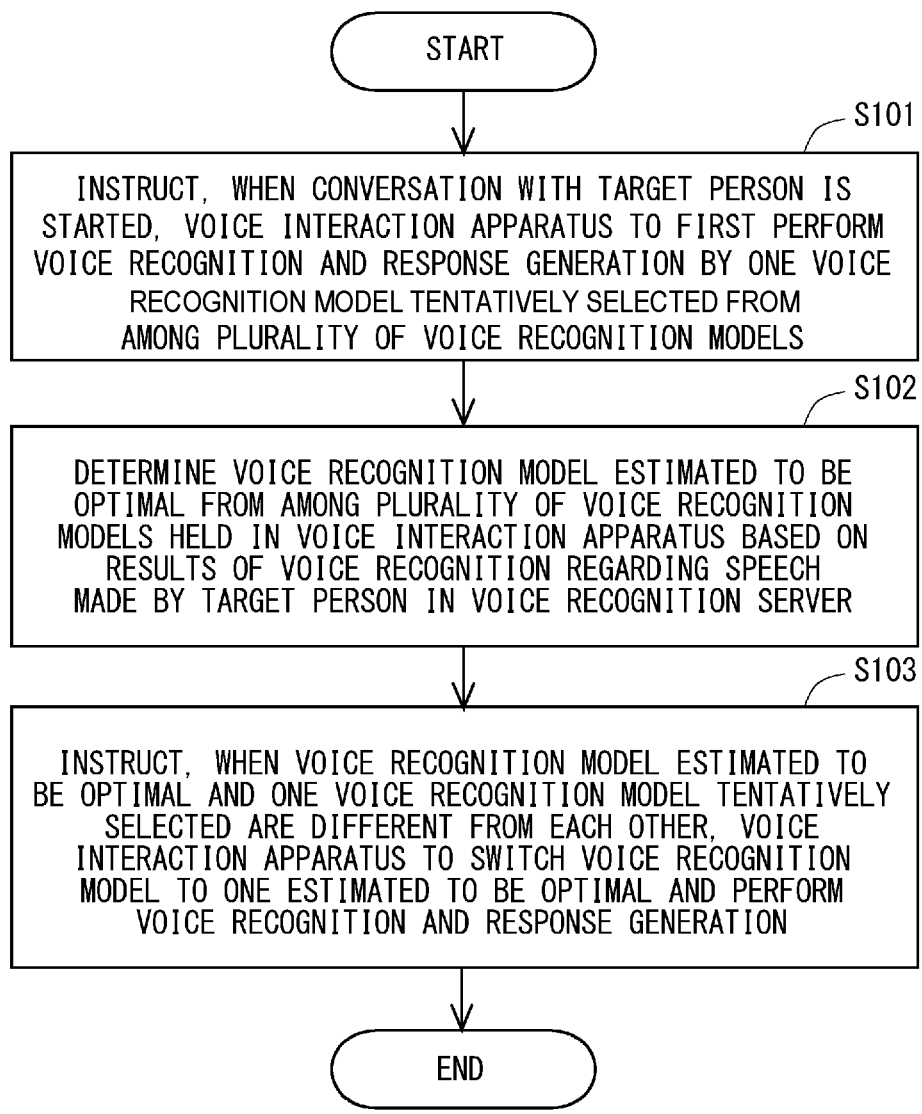
FIG. 5 is a flowchart showing a flow of processing of the control system according to the first embodiment.

FIG. 5 is a flowchart showing a flow of the processing of the control system 30. As shown in FIG. 5, when a conversation with the target person is started, the control system 30 first instructs the voice interaction system 20 to perform voice recognition and response generation by the one voice recognition model that has been tentatively selected from among the plurality of voice recognition models stored in the storage unit 26 (Step S101). Next, the control system 30 determines the voice recognition model that is estimated to be optimal from among the plurality of voice recognition models held in the voice interaction system 20 based on results of the voice recognition regarding the speech made by the target person in the voice recognition server (Step S102). Next, when the voice recognition model that is estimated to be optimal and the one voice recognition model that has been tentatively selected are different from each other, the control system 30 instructs the voice interaction system 20 to switch the voice recognition model to the one that is estimated to be optimal and perform voice recognition and response generation (Step S103).

From the above discussion, the control system 30 of the voice interaction system 20 according to this embodiment first instructs the voice interaction system 20 to perform voice recognition and response generation by the one voice recognition model that has been tentatively selected from among the plurality of voice recognition models included in the voice interaction system 20 when a conversation with the target person is started. Then the control system 30 performs voice recognition of the speech made by the target person in the voice recognition server while voice recognition and response generation are being performed by one voice recognition model that has been tentatively selected. According to this technique, it is possible to reduce the time required for the response. Then the control system 30 determines the voice recognition model that is estimated to be optimal from among the plurality of voice recognition models held in the voice interaction system 20 based on results of the voice recognition regarding the speech made by the target person in the voice recognition server. According to this technique, it is possible to reduce unnaturalness of the conversation.

Second Embodiment

Hereinafter, with reference to the drawings, a second embodiment of the present disclosure will be explained.

Figure 6:
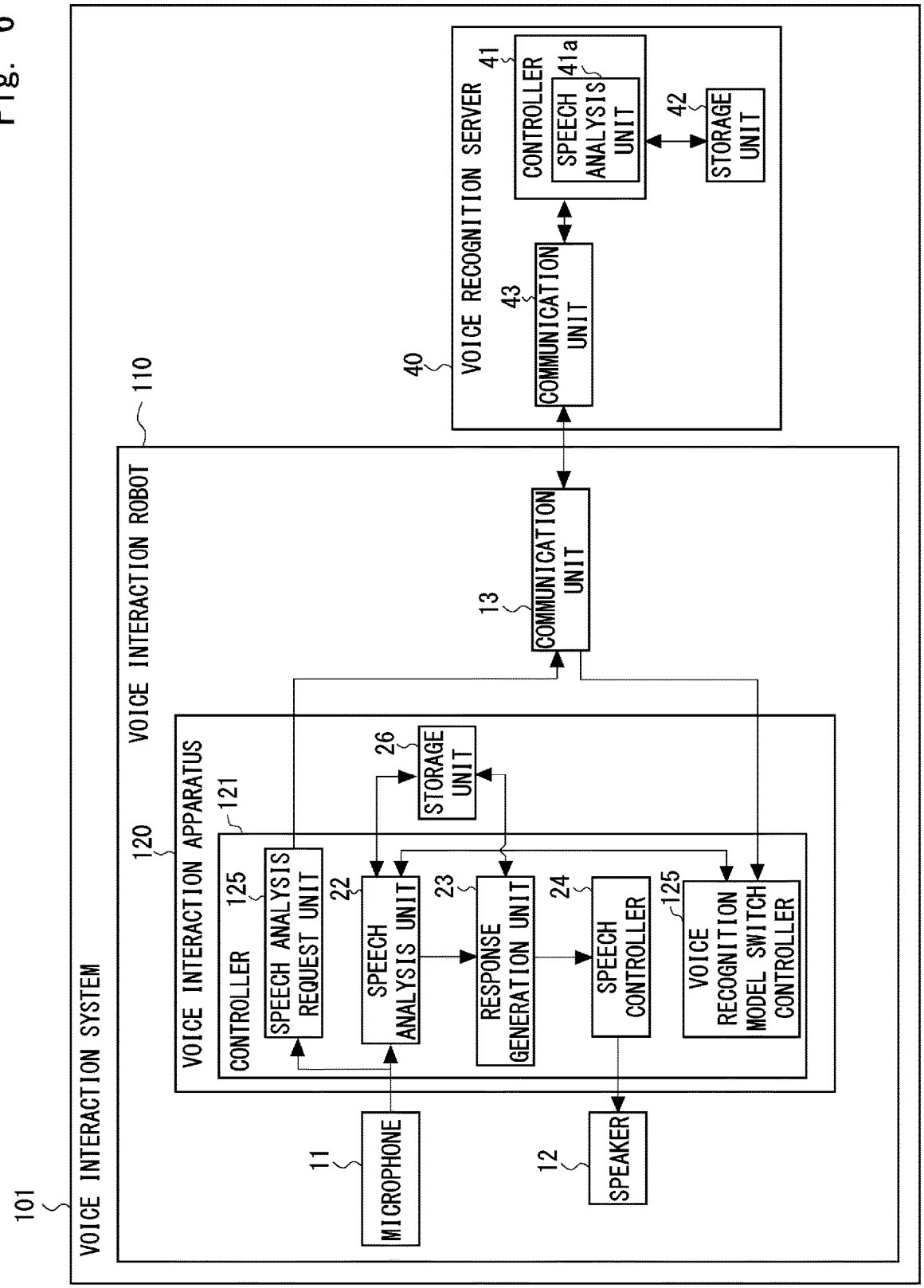
FIG. 6 is a block diagram for describing a configuration of a voice interaction system including a voice interaction system according to a second embodiment.

FIG. 6 is a block diagram for describing a configuration of a voice interaction system 101 including a voice interaction system 120 according to the second embodiment. As shown in FIG. 6, the voice interaction system 101 includes a voice interaction robot 110 and a voice recognition server 40.

The configuration of the voice interaction robot 110 is different from that of the voice interaction robot 10 in the voice interaction system 1 described with reference to FIG. 1 of the first embodiment in that the voice interaction robot 110 does not include a control system. The configuration of the voice interaction system 120 is different from that of the voice interaction system 20 of the voice interaction system 1 described with reference to FIG. 1 of the first embodiment in that the voice interaction system 120 further includes a voice recognition model switch controller 125 in the controller 121. The controller 121 is composed of, for example, a CPU. In the voice interaction system 101, the voice recognition model switch controller 125 in the controller 21 of the voice interaction system 120 takes the role of the control system according to the first embodiment.

The is, when a conversation with the target person is started, the voice recognition model switch controller 125 first performs voice recognition and response generation by the one voice recognition model that has been tentatively selected from among the plurality of voice recognition models. Then the voice recognition model switch controller 125 determines the voice recognition model that is estimated to be optimal from among the plurality of voice recognition models based on the results of the voice recognition of the speech made by the target person in the voice recognition server 40. Further, when the voice recognition model that is estimated to be optimal and the one voice recognition model that has been tentatively selected are different from each other, the voice recognition model switch controller 125 instructs the speech analysis unit 22 to switch the voice recognition model to the one that is estimated to be optimal and to perform voice recognition and response generation.

As described above, with the voice interaction system 120 according to the second embodiment, it becomes possible to reduce time required for the response and to reduce unnaturalness of the conversation.

Third Embodiment

Hereinafter, with reference to the drawings, a third embodiment of the present disclosure will be explained.

Figure 7:
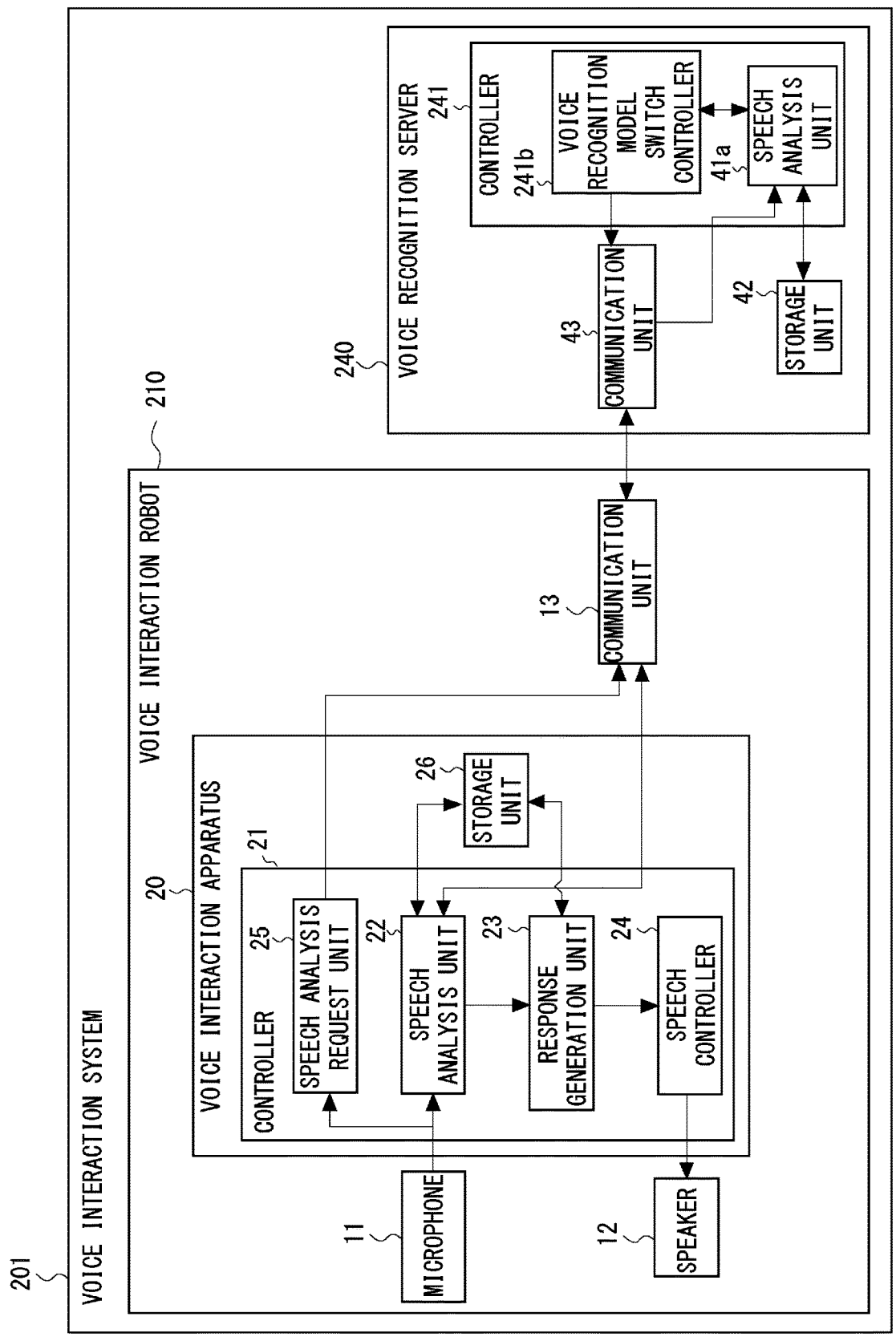
FIG. 7 is a block diagram for describing a configuration of a voice interaction system including a voice recognition server according to a third embodiment.

FIG. 7 is a block diagram for describing a configuration of a voice interaction system 201 including a voice recognition server 240 according to the third embodiment. As shown in FIG. 7, the voice interaction system 201 includes a voice interaction robot 210 and the voice recognition server 240.

The configuration of the voice interaction robot 210 is different from that of the voice interaction robot 10 in the voice interaction system 1 described with reference to FIG. 1 according to the first embodiment in that the voice interaction robot 210 does not include a control system. The configuration of the voice recognition server 240 is different from that of the voice recognition server 40 in the voice interaction system 1 described with reference to FIG. 1 according to the first embodiment in that the voice recognition server 240 further includes a voice recognition model switch controller 241b in the controller 241. The controller 241 is composed of, for example, a CPU. In the voice interaction system 201, the voice recognition model switch controller 241b in the controller 241 of the voice recognition server 240 takes the role of the control system according to the first embodiment.

That is, when a conversation with the target person is started, the voice recognition model switch controller 241b first instructs the speech analysis unit 22 of the voice interaction system 20 to perform voice recognition and response generation by the one voice recognition model that has been tentatively selected from among the plurality of voice recognition models. Then the voice recognition model switch controller 241b determines the voice recognition model that is estimated to be optimal among the plurality of voice recognition models held in the voice interaction system based on the results of performing voice recognition of the speech made by the target person. Further, when the voice recognition model that is estimated to be optimal and the one voice recognition model that has been tentatively selected are different from each other, the voice recognition model switch controller 241b instructs the speech analysis unit 22 of the voice interaction system 20 to switch the voice recognition model to the one that is estimated to be optimal via the communication unit 43 and the communication unit 13 and to perform voice recognition and response generation.

As described above, with the voice recognition server 240 according to the third embodiment, it becomes possible to reduce time required for the response and to reduce unnaturalness of the conversation.

Note that the present disclosure is not limited to the aforementioned embodiments and may be changed as appropriate without departing from the spirit of the present disclosure.

The processing by the present disclosure can be achieved by causing a computer or the like to execute a program. More specifically, in a computer included in any one of the control system, the voice interaction system, and the voice recognition server, a program stored in a program memory is loaded to a main memory unit, and this program is executed and implemented by control of a CPU. The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:
1. A control system comprising:
a central processing unit configured to control a voice interaction system including a storage; and a plurality of voice recognition models held in the storage, wherein:

the plurality of voice recognition models include an initial voice recognition model that has been tentatively selected among the plurality of voice recognition models, one or more intermediate voice recognition models, and an optimal voice recognition model that is estimated to be optimal among the plurality of voice recognition models;

the central processing unit instructs, when a conversation with a target person is started, the voice interaction system to first perform voice recognition and response generation by the initial voice recognition model, determines the optimal voice recognition model based on results of the voice recognition of a speech made by the target person in a voice recognition server, and instructs, when the optimal voice recognition model and the initial voice recognition model are different from each other, the voice interaction system to switch the voice recognition model to the optimal voice recognition model and to perform voice recognition and response generation; and the central processing unit causes, when the voice interaction system switches from the initial voice recognition model to the optimal voice recognition model, the voice interaction system to switch in stages from the initial voice recognition model through the one or more intermediate voice recognition models and to the optimal voice recognition model in a descending order of similarity.

2. The control system according to claim 1, wherein the initial voice recognition model is a voice recognition model that has been determined to be used most frequently among the plurality of voice recognition models included in the voice interaction system based on past conversation information.

3. The control system according to claim 1, wherein the central processing unit takes into account information other than a voice regarding the target person when the central processing unit determines the voice recognition model that is estimated to be optimal.

4. A voice interaction system comprising:

a plurality of voice recognition models and a controller, wherein the plurality of voice recognition models include an initial voice recognition model that has been tentatively selected among the plurality of voice recognition models, one or more intermediate voice recognition models, and an optimal voice recognition model that is estimated to be optimal among the plurality of voice recognition models;

the controller first performs, when a conversation with a target person is started, voice recognition and response generation by the initial voice recognition model, determines the optimal voice recognition model based on results of the voice recognition of a speech made by the target person in a voice recognition server, switches from the initial voice recognition model through the one or more intermediate voice recognition models and to the optimal voice recognition model in a descending order of similarity, when the optimal voice recognition model and the initial voice recognition model are different from each other, the optimal voice recognition model performs voice recognition and response generation.

5. A method of controlling a voice interaction system including a plurality of voice recognition models, the plurality of voice recognition models including an initial voice recognition model that has been tentatively selected among the plurality of voice recognition models, one or more intermediate voice recognition models, and an optimal voice recognition model that is estimated to be optimal among the plurality of voice recognition models, the method comprising the following steps of:

instructing, when a conversation with a target person is started, the voice interaction system to first perform voice recognition and response generation by the initial voice recognition model;

determining the optimal voice recognition model based on results of the voice recognition of a speech made by the target person in a voice recognition server;

instructing, when the optimal voice recognition model and the initial voice recognition model are different from each other, the voice interaction system to switch the voice recognition model to the optimal voice recognition model and to perform voice recognition and response generation; and causing, when the voice interaction system switches from the initial voice recognition model to the optimal voice recognition model, the voice interaction system to switch in stages from the initial voice recognition model through the one or more intermediate voice recognition models and to the optimal voice recognition model in a descending order of similarity.

* * * * *